(12) United States Patent
Chen

(10) Patent No.: US 6,290,355 B1
(45) Date of Patent: Sep. 18, 2001

(54) EYEGLASSES WITH LENSES CHANGEABLE

(76) Inventor: Yao-Ping Chen, P.O. Box 90, Tainan City (TW)

( * ) Notice: Subject to any disclaimer, the term of this patent is extended or adjusted under 35 U.S.C. 154(b) by 0 days.

(21) Appl. No.: 09/695,924

(22) Filed: Oct. 26, 2000

(51) Int. Cl.[7] .................................................. G02C 1/04
(52) U.S. Cl. ........................ 351/103; 351/108; 351/109
(58) Field of Search .................................... 351/103–109, 351/154

(56) References Cited

U.S. PATENT DOCUMENTS 2,208,103 * 7/1940 Paterson ................................ 351/103
2,254,746 * 9/1941 Line ...................................... 351/103
6,070,978 * 6/2000 Temming .............................. 351/103

* cited by examiner

*Primary Examiner*—Huy Mai

(57) ABSTRACT

Eyeglasses with lenses changeable include a frame provided with two semi-rims, and two lenses. The semi-rims have two bent insert means formed in two ends to fit in two insert holes bored in the two opposite sides of the two lenses. The two lenses respectively have an intermediate insert grooves formed in an upper curved edge for each semi-rim to fit therein so as to let each lens combined stably with each semi-rim without swaying or falling off. Thus the lenses may be assembled with the semi-rims easily and quickly, and in addition may be changed to other ones of different colors.

2 Claims, 5 Drawing Sheets

EYEGLASSES WITH LENSES CHANGEABLE

BACKGROUND OF THE INVENTION

1. Field of the Invention

This invention relates to eyeglasses with lenses changeable, particularly to one having a frame with two semi-rims for holding two lenses, and each semi-rim having a bent fit means formed respectively in two ends to fit in a insert hole of each lens, with the semi-rim fitting in a fit groove formed in an upper curved edge of each lens so as to stabilize the leans in each semi-rim without swaying or failing off. In addition, the lenses with different colors can be readily changeable if wanted.

2. Description of the Prior Art

Known conventional semi-rim eyeglasses shown in FIGS. 1 and 2, include a frame 1 with two semi-rims 10, each semi-rim 10 having two holes 11, 11' respectively in two ends, and two lenses 12 combined in the two semi-rims 10 with two hang strings 13 having one end fixed in the two holes 11. 11' of the two ends of the semi-rims 10 and extending under the lower curved edge of each leans 12 and then the other end protruding in one of the holes 11 and fixed firmly with each semi-rim 10.

However, the known conventional semi-rim eyeglasses have troublesome assembling the hang string 13 with the semi-rims 10 in order to keep the lenses 12 in the semi-rims 11 resulting in difficulty in changing the lenses 12, and in addition, the end portions of the hang strings 13 may form a gap between the semi-rim 10 and the lens 12 as shown in FIG. 2, with the lenses 12 unable to closely contact with the semi-rims 10. Consequently the lenses 12 are not kept stable in the semi-rims 10, liable to fall down in case of receiving a shock, and in addition, the tightness of the hang strings 13 against the lenses 12 is not easily adjustable, with the lenses 12 apt to fall off in case of looseness and with the hang strings 13 apt to break in case of excessive tightness. Moreover, the hang strings 13 may weaken owing to erosion with sweat or oil after a period of use, not enduring long.

SUMMARY OF THE INVENTION

The objective of the invention is to offer eyeglasses with lenses changeable easily and not falling off.

The feature of the invention is two semi-rims provided in a frame, and each semi-rim has two fit means formed in two ends to fit firmly in two insert holes provided in two opposite sides of each lens so as to keep the lens tightly enough with the two semi-rims without falling off.

BRIEF DESCRIPTION OF DRAWINGS

This invention will be easily understood by referring to the accompanying drawings, wherein.

DETAILED DESCRIPTION OF THE PREFERRED EMBODIMENT

Figure 1:
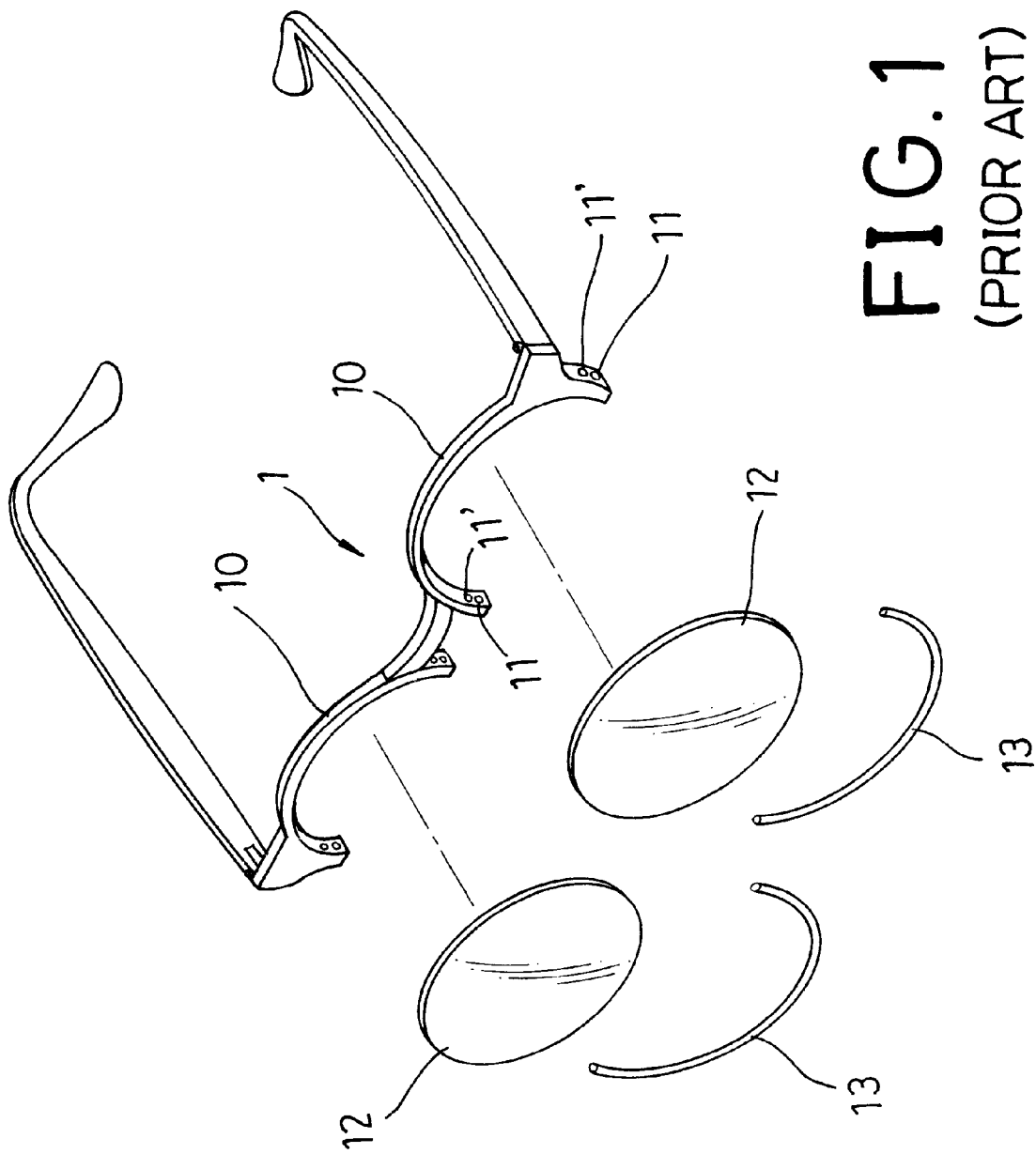
FIG. 1 is an exploded perspective view of known conventional eyeglasses.
Figure 2:
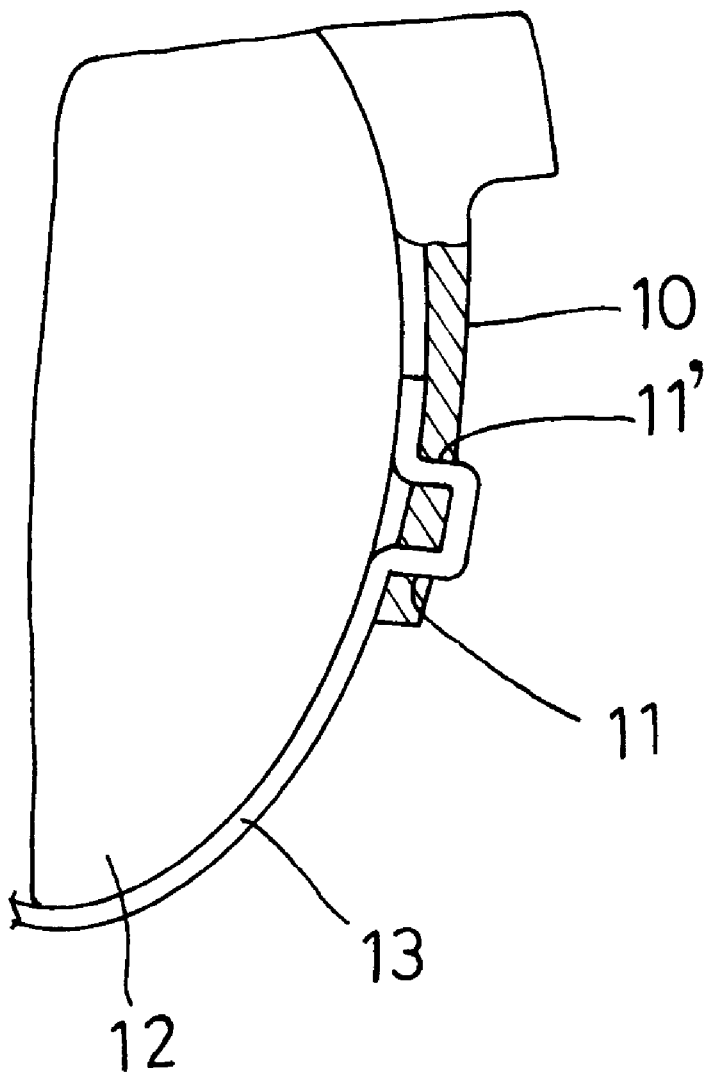
FIG. 2 is a partial cross-sectional view of the known conventional eyeglasses.
Figure 3:
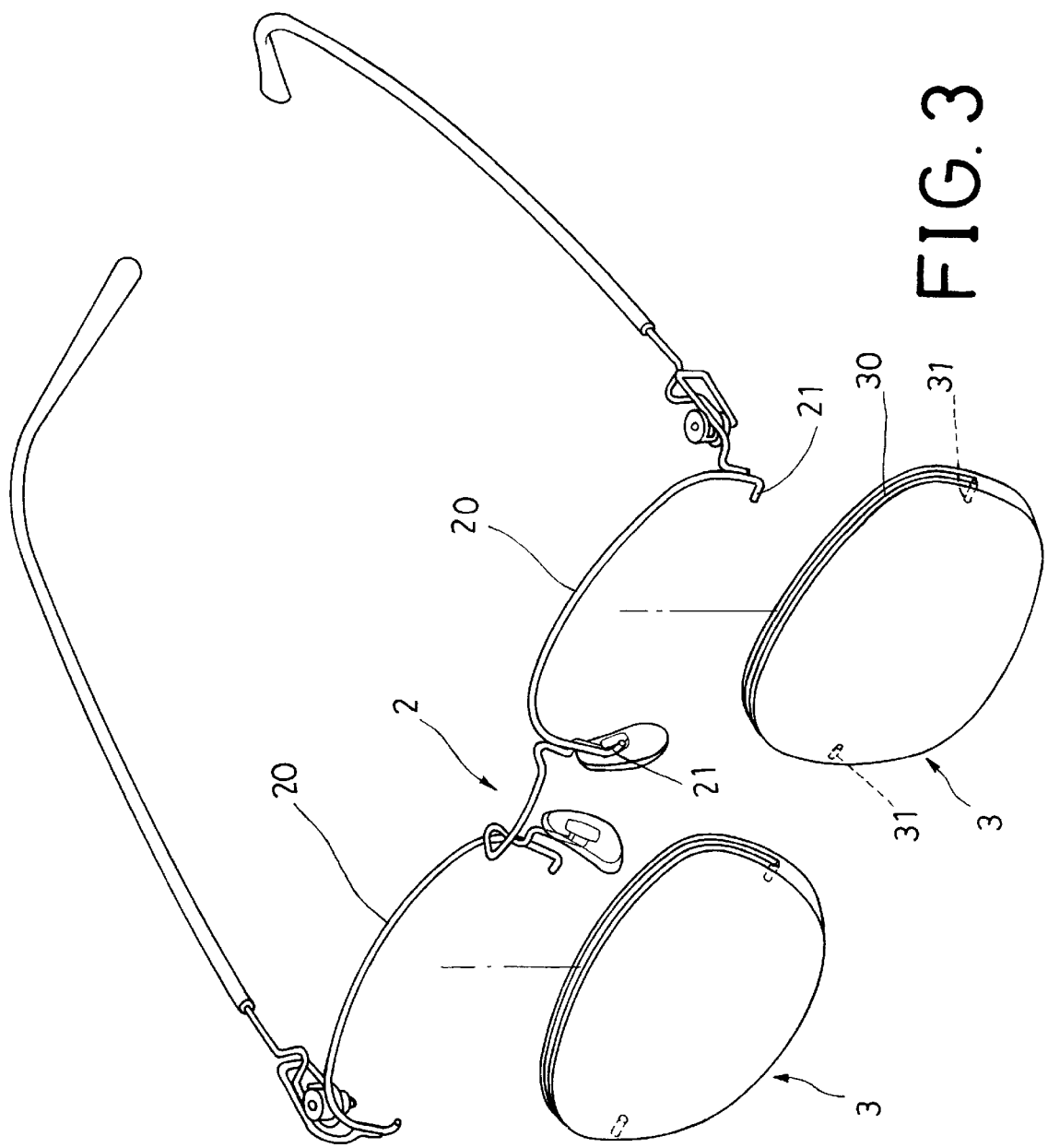
FIG. 3 is an exploded perspective view of eyeglasses with lenses changeable in the present invention.

The preferred embodiment of eyeglasses with lenses changeable in the present invention, as shown in FIG. 3, includes a frame 2, two semi-rims 20 provided in the frame 2 and having a proper curvature for a lens 3 and two bent fit means 21 formed in two ends, two lenses 3 respectively having an upper curved edge formed with than intermediate insert groove 30 for each semi-rim 20 to fit therein, and an insert hole 31 bored in two opposite sides for the bent fit means 21 of each semi-rim 20 to engage with.

Figure 4:
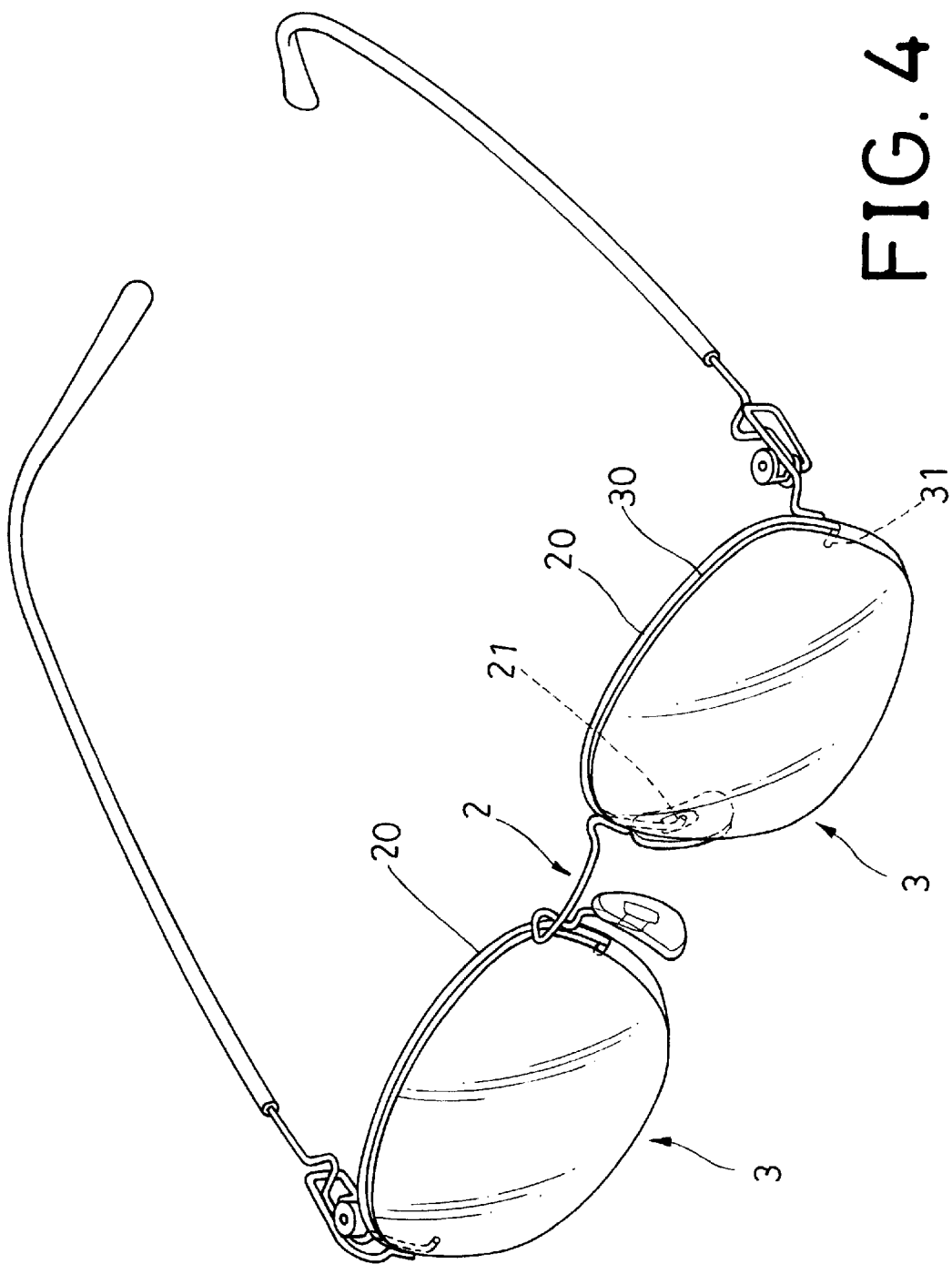
FIG. 4 is a perspective view of the eyeglasses with lenses changeable in the present invention; and, FIG. 5 is a partial cross-sectional view of the eyeglasses with lenses changeable in the present invention.
Figure 5:
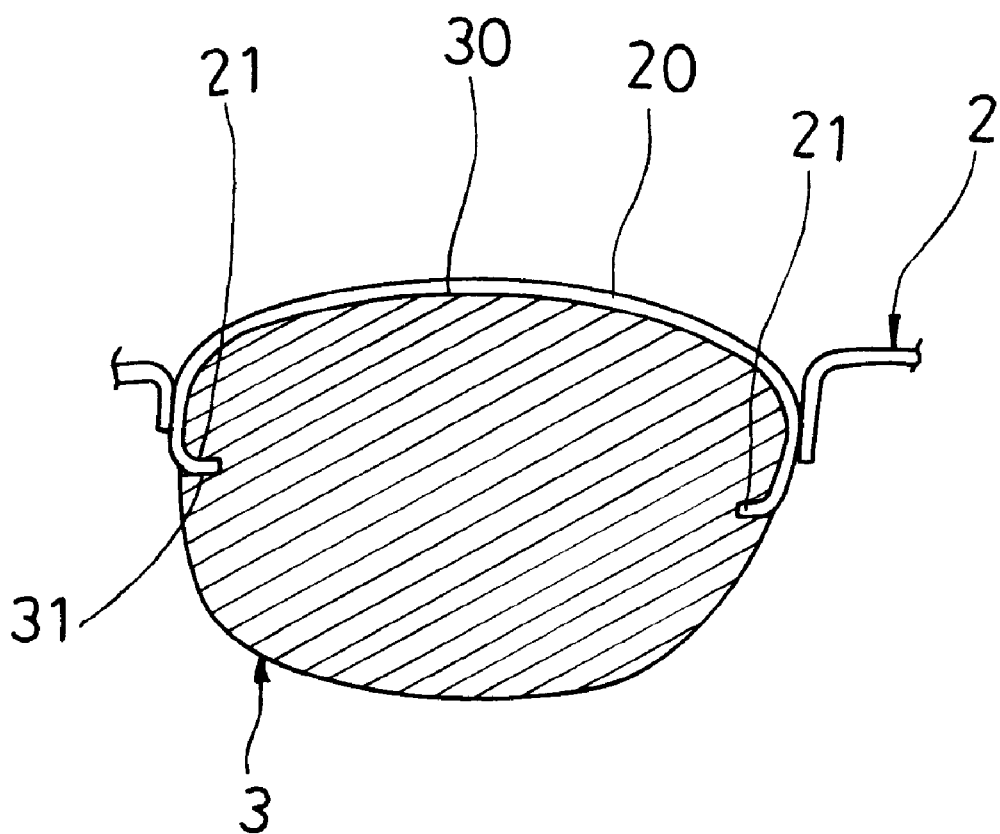

In assembling, as shown in FIGS. 3, 4 and 5, firstly, expand a little the two ends of the two semi-rims 20 and insert the lenses 3 in the semi-rims 20, with the bent fit means 21 of the semi-rims 20 inserted in the insert holes 31 of the lenses 3. Thus, the lenses 3 are stably combined with the semi-rims 20, with the edges of the semi-rims 20 closely fitting in the intermediate insert groove 30 of the lenses 3, with no fear of swaying or falling of the lenses 3.

If the lenses 3 are to be changed owing to degrees of myopia or hypermetropia changed or any other reasons, the two ends of the two semi-rims 20 are little expanded outward, forcing the two bent fit means 21 separate from the insert holes 31 of the lenses 3 to let the lenses 3 removed form the semi-rims 20. Then new lenses can be combined with the semi-rims 20, very simple and quick to handle.

The invention has the following advantages, as understood from the aforesaid description.

1. The lenses can be stably combined with the two semi-rims of the frame, never loosening or falling off.
2. Assembling of the lenses with the semi-rims is simple and quick.
3. The lenses can be replaced with other lenses of various nearsighted or far-sighted degrees in case of the nearsighted or far-sighted degrees of eyes changed, and replacing process is very easy and quick, avoiding wearing the same lenses for a long period of time, and saving expenditure for buying various pairs of eyeglasses.
4. Lenses of different colors can be changed according to a person's taste and liking.

While the preferred embodiment of the invention has been described above, it will be recognized and understood that various modifications may be made therein and the appended claims are intended to cover all such modifications that may fall within the spirit and scope of the invention.

What is claimed is:

1. Eyeglasses with lenses changeable comprising a frame, two semi-rims provided in said frame, each said semi-rim having two bent insert means formed in two ends, two lenses respectively combined with said semi-rims and having an intermediate insert groove formed in an upper curved edge, and an insert hole bored respectively in two opposite sides; said two bent fit means of said two semi-rims fitting in said insert holes of said lenses, said semi-rims fitting in said intermediate insert grooves of said lenses, thus said lenses firmly assembled with said semi-rims with easiness and fastness without fear of swaying or falling off, and said lenses changeable to other ones of different colors.

2. The eyeglasses with lenses changeable as claimed in claim 1, wherein said semi-rims are shaped such curved as to fit an upper edge of said lenses.

* * * * *